United States Patent
Amine et al.

(10) Patent No.: US 12,021,220 B2
(45) Date of Patent: Jun. 25, 2024

(54) CATHODE MATERIALS FOR SECONDARY BATTERIES

(71) Applicant: UCHICAGO ARGONNE, LLC, Chicago, IL (US)

(72) Inventors: Khalil Amine, Oakbrook, IL (US); Tongchao Liu, Westmont, IL (US); Jun Lu, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 18/133,804

(22) Filed: Apr. 12, 2023

(65) Prior Publication Data

US 2023/0253543 A1    Aug. 10, 2023

Related U.S. Application Data

(62) Division of application No. 16/791,807, filed on Feb. 14, 2020, now Pat. No. 11,735,710.

(60) Provisional application No. 62/850,929, filed on May 21, 2019.

(51) Int. Cl.
| | |
|---|---|
| *H01M 4/131* | (2010.01) |
| *H01M 4/1391* | (2010.01) |
| *H01M 4/36* | (2006.01) |
| *H01M 4/505* | (2010.01) |
| *H01M 4/525* | (2010.01) |
| *H01M 10/0525* | (2010.01) |

(52) U.S. Cl.
CPC ......... *H01M 4/131* (2013.01); *H01M 4/1391* (2013.01); *H01M 4/364* (2013.01); *H01M 4/505* (2013.01); *H01M 4/525* (2013.01); *H01M 10/0525* (2013.01)

(58) Field of Classification Search
CPC .... H01M 4/131; H01M 4/1391; H01M 4/364; H01M 4/366; H01M 4/505; H01M 4/525
See application file for complete search history.

(56) References Cited

U.S. PATENT DOCUMENTS

| | | |
|---|---|---|
| 8,926,860 B2 | 1/2015 | Sun et al. |
| 9,463,984 B2 | 10/2016 | Sun et al. |
| (Continued) | | |

FOREIGN PATENT DOCUMENTS

| | | |
|---|---|---|
| EP | 2 975 678 | 1/2016 |
| JP | 2013-182783 | 9/2013 |
| (Continued) | | |

OTHER PUBLICATIONS

English translation of JP Publication 5871186, Mar. 2016.*
(Continued)

*Primary Examiner* — Brittany L Raymond
(74) *Attorney, Agent, or Firm* — Foley & Lardner LLP

(57) ABSTRACT

A cathode material comprising: a cathode active material of formula $LiNi_xMn_yCo_zO_2$ or $NaNi_xMn_yCo_zO_2$ and having a partial or whole particle concentration gradient, wherein at least two or three elements concentration gradually change in the part or whole particle from the center part to the surface part of the particle (i.e. along a vector radius); $0.5 < x \leq 1$, $0 \leq y \leq 0.33$, $0 \leq z \leq 0.33$.

11 Claims, 14 Drawing Sheets

(56) References Cited

U.S. PATENT DOCUMENTS

| | | | |
|---|---|---|---|
| 2014/0027670 A1* | 1/2014 | Sun | H01M 10/0525 |
| | | | 252/182.1 |
| 2014/0212755 A1 | 7/2014 | Wu et al. | |
| 2016/0260965 A1 | 9/2016 | Wu et al. | |
| 2018/0212237 A1 | 7/2018 | Lee et al. | |
| 2019/0044142 A1* | 2/2019 | Sun | H01M 4/626 |
| 2020/0099045 A1* | 3/2020 | Shin | H01M 4/366 |

FOREIGN PATENT DOCUMENTS

| | | | |
|---|---|---|---|
| JP | 5871186 | * | 3/2016 |
| WO | WO-2016/116862 | | 7/2016 |

OTHER PUBLICATIONS

Lee, et al., "Roles of Surface Chemistry on Safety and Electrochemistry in Lithium Ion Batteries," Acc. Chem. Res. 2013, vol. 46, No. 5, pp. 1161-1170 (abstract only).

Non-Final Office Action on U.S. Appl. No. 16/791,807 dated Jan. 12, 2023.

Notice of Allowance on U.S. Appl. No. 16/791,807 dated Apr. 5, 2023.

Sun, et al., "High-energy cathode material for long-life and safe lithium batteries," Nature Materials, Apr. 200, vol. 8, No. 4, pp. 320-324.

Sun, et al., "Nanostructured high-energy cathode materials for advanced lithium batteries," Nature Materials, Oct. 7, 2019, vol. 11, No. 11, pges 942-947.

U.S. Office Action on U.S. Appl. No. 16/791,807 dated Jul. 20, 2022.

* cited by examiner

CATHODE MATERIALS FOR SECONDARY BATTERIES

CROSS-REFERENCE TO RELATED APPLICATIONS

This application claims the benefit of and priority to U.S. Patent Application No. 62/850,929, filed on May 21, 2019, and which is incorporated herein by reference in its entirety for any and all purposes.

GOVERNMENT RIGHTS

This application is a divisional of, and claims priority to, U.S. patent application Ser. No. 16/791,807, filed Feb. 14, 2020, which in turn claims the benefit of and priority to U.S. Patent Application No. 62/850,929, filed on May 21, 2019, and which is incorporated herein by reference in its entirety for any and all purposes.

FIELD

The present technology is generally related to cathode materials for lithium-ion batteries or sodium-ion batteries, and methods to prepare secondary batteries containing the same. More specifically, the present technology is related to particulate cathode materials for lithium/sodium ion batteries, the particles having a concentration gradient along a vector radius of the particles that results in improved electrochemical performance, and suppressing or significantly reducing micro-cracks that are typically generated during repeated lithium- or sodium-ion insertion or desertion.

BACKGROUND

Electrical energy storage systems in the form of Li-ion batteries (387 Wh kg) command a significant market portion of consumer electronics, however current theoretical energy density still falls short of replacing gasoline (12200 Wh kg') applications. As one promising cathode candidate for high-energy-density and electric vehicle lithium-ion batteries, layered $LiNi_xMn_yCo_zO_2$ ("NMC;" where x+y+z=1) materials have been extensively studied. They possess not only high reversible capacity but also exhibit good lithium-ion diffusivity and environmental compatibility than the traditional $LiCoO_2$. The main strategy for increasing the reversible capacity of NCM cathodes has been a progressive increase in the Ni fraction. However, this causes a proportional deterioration of the cathode's ability to retain its original capacity during cycling. The observed capacity fade of NMC cathodes is typically attributed to the parasitic surface reactions arising from accumulation of a NiO-like phase on the surface of the cathode material from the reduction of reactive $Ni^{4+}$ in a highly delithiated state and microcracks generated by the anisotropic lattice variation upon cycling, which synergistically destabilizes the crystal structure and electrochemical stability.

To overcome the aforementioned inherent shortcomings of Ni-rich layered cathodes, high-capacity hybrid NMC cathodes were developed by spatially partitioning the Ni distribution at a particle level. See Nature Mater. 2009, 8(4): 320, Nature Mater. 2012, 11(11): 942; U.S. Pat. No. 9,463, 984; and U.S. Patent Publication Nos. 2014/0027670 and 2016/0260965. The Ni-rich NMC composition at the center delivers a high capacity that is protected by the Ni-deficient composition at the surface. These core-shell and full concentration gradient composition design, mainly control Ni content (lower Ni near the particle surface), and have exhibited good cycling stability. However, the lower surface Ni content inevitably leads to a capacity reduction. In addition, the outer shell with more Mn usually exhibits poor $Li^+$ diffusion and possesses the rate-limiting properties.

SUMMARY

To improve the performance of prior art high concentration Ni-based cathode materials, cathode materials with partial or whole particle concentration gradients for lithium- or sodium-ion batteries are provided. A cathode material with a partial or whole particle concentration gradient, wherein at least two of the Ni, Mn, and Co concentrations gradually change across part of or the whole vector radius of the particle. As used herein the term "vector radius" is used to show a directionality of the radius of the particle from the center to the surface. The particles are generally spherical and thus characterized by the vector radius, however even where the particles do not have a general spherical shape or an irregular spherical or oblate spheroid shape, the radius may be approximated as any radial measurement from a mean center to a surface. In particular, and differing from prior art concentration gradient cathodes, the newly designed concentration gradient cathode mainly controls the distribution of Co in the whole particle, rather than that of Ni. The Co concentration increases along the vector radius (i.e. from the center to the surface of the particle), in order to achieve the improved electrochemical performance for lithium- or sodium-ion batteries. A method for preparing the cathode active material is also provided herein.

In one aspect, a cathode material includes a cathode active material of formula $LiNi_xMn_yCo_zO_2$ or $NaNi_xMn_yCo_zO_2$ and having a partial or whole particle concentration gradient along a vector radius of the particle, wherein the concentration of at least two of the Ni, Mn, and Co gradually changes in part of or across the whole vector radius of the particle; and at any given point in the radius of the particle $0.5 \leq x \leq 1$, $0 \leq y \leq 0.33$, $0 \leq z \leq 0.33$. In such embodiments, the Co concentration increases along a vector radius of the particle. In some embodiments, the concentration of the Ni is constant or slightly decreased along the vector radius, the concentration of the Mn is constant or partly/continuously decreased along the vector radius, and the Co concentration is partly or continuously increased along the vector radius.

In another aspect, a cathode material is represented as $\delta Li_2 TmO_3 \cdot (1-\delta) LiTm'O_2$ wherein Tm is one or more metal ions selected from the group of Mn, Ni, and Co; Tm' is Co, and optionally Ni and/or Mn, and $0<\delta<1$; the concentration of at least two of Mn, Ni, and Co gradually changes in the part or whole particle along a vector radius of the particle, and the Co concentration is partly or continuously increased along the vector radius.

In another aspect, a process of preparing a gradient cathode material is provided, the process including preparing a core composition solution (Sol1) comprising Ni, Mn, and Co ions in a first ratio; preparing a surface composition solution (Sol2) comprising Ni, N, and Co ions in a second ratio different from the first ratio; mixing the core composition solution with the surface composition solution in a mixing ratio (volume basis) from 100%:0% to 0%:100% with gradual change and by mixing a chelating agent and a precipitant agent in a reactor at the same time to form a precipitate having a concentration of Ni that is constant or slightly decreased along a vector radius of the particle, a concentration of Mn that is constant or partly/continuously decreased along the vector radius; and a concentration of Co that is partly/continuously increases along the vector radius; mixing the precipitate with a lithium or sodium salt; and heating-treating the mixed precipitate and lithium or sodium salt to form the gradient cathode material wherein: the total amount of Co in the combined Sol1 and Sol2 is less than 50 mol % of all metals.

DETAILED DESCRIPTION

Figure 1:
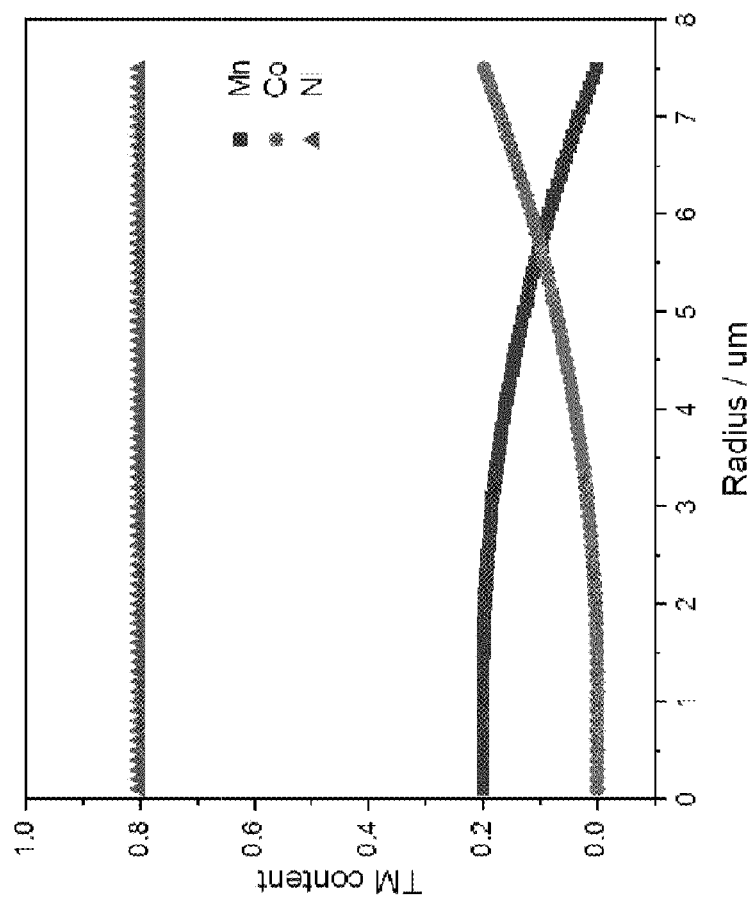
FIG. 1 depicts a representative concentration of gradient concentration cathode. The Ni concentration is constant from particle center to surface the Mn concentration is decreased from particle center to surface; and the Co concentration is increased from the particle center to surface.
Figure 1:
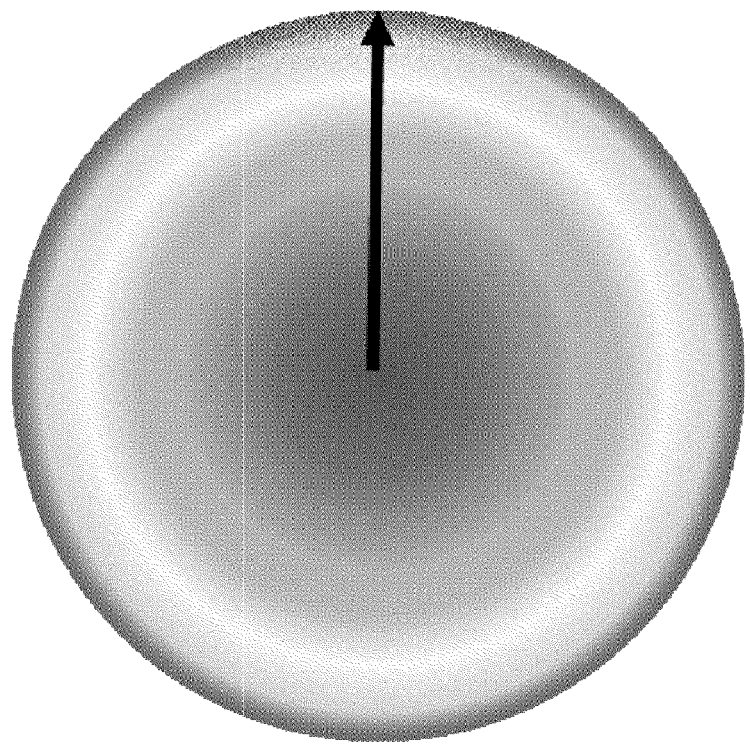

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Considerable efforts have been devoted to investigating the intrinsic properties of Ni, Mn and Co. Of the metallic elements present in the NMC, Co remains to be the most important in enabling electronic conductivity, high rate performance, and well-crystallized structure. See *Acc. Chem. Res.* 2013, 46(5): 1161-1170. Therefore, having the proper distribution of cobalt is expected to achieve further improvement in NMC electrochemical properties. This disclosure focuses on next-generation lithium-ion energy storage solutions that are seeking to bring high-energy-density devices that can be implemented into electronic devices, electric vehicles, and grid-level energy storage into reality.

To improve the performance of high concentration nickel-based cathode materials, newly designed cathode materials have been prepared. The cathode materials for lithium- or sodium-ion batteries have a partial or whole particle concentration gradient along a vector radius of the particle. The cathode materials exhibit improved cycle life and rate capability, as well as weakened interfacial reaction, and eliminate, or significantly reduce, inside particle cracking. As used herein the phrase "a partial or whole particle concentration gradient" refers to the concentration profile of the metals in the particle moving along the vector radius and that a part/partial of the profile along the radius may have a gradient or the entire length of the radius may exhibit a gradient.

A cathode material may be expressed as $LiNi_xMn_yCo_zO_2$ or $NaNi_xMn_yCo_zO_2$ with a part or whole particle concentration gradient, wherein the concentrations of at least two of the elements gradually change in the part/whole particle along a vector radius. The cathode material may be characterized in some embodiments by having a concentration of Ni that is constant or slightly decreased along the vector radius, a concentration of Mn that is constant or partly/continuously decreased along the vector radius; the concentration of Co is partly or continuously increases along the vector radius, wherein $0.33<x\leq1$, $0\leq y\leq0.67$, $0\leq z\leq0.67$. In some embodiments, $0.5<x\leq1$, $0\leq y\leq0.33$, $0\leq z\leq0.33$.

In some embodiments, a Li- and Mn-rich cathode material expressed by $\delta Li_2TmO_3 \cdot (1-\delta)LiTm'O_2$ is provided, where Tm is one or more metal ions selected from the group consisting of Mn, Ni, and Co; and Tm' is Co and optionally one or more of Ni and Mn, and $0<\delta<1$. This cathode material may be characterized by part of or the whole particle having concentration gradient along a vector radius of the particle, wherein at least two elements gradually change in concentration in the part or whole particle along the vector radius as shown in FIGS. 1 to 6. More specifically, the Co concentration increases going toward the surface of the particle.

In some embodiments, and unlike most of the gradient cathodes of the prior art where the gradient composition mainly depends on Ni where the Co usually decreases in concentration from the center to the surface of the particle, here the Co concentration increases along the vector radius of the particle to achieve significant improvement in electrochemical performance of lithium-ion batteries.

In other embodiments, when the concentration of any of the metals in the gradient cathode decreases, it could be via one or more slopes—i.e. there may be one or more rates of concentration gradient change in that element concentration along the radius of the particle.

In some embodiments, the cathode material may contain a dopant cation, wherein the dopant cation is one or more metal ions selected from the group consisting of Mg, Al, Ca, Cr, V, Fe, Cu, Zn, Zr, Nb, Mo, Ru, Ir, La and a combination thereof; these dopants could be of a constant concentration across the whole particle or exist only at the surface of the particle (surface doping). As used herein, where a material is at or deposited on the surface of the particle, the surface refers to the region of the particle within 0.2 μm of the outermost reaches of the particle.

Surface protection methods for electrochemical devices containing the cathode described above are also provided. In such embodiments, the surface protection method, may include a surface coating layer. The surface coating layer materials may be selected from a conductive carbon coating, a metal oxide, a metal fluoride, a metal phosphate and a combination thereof. Illustrative metal oxides coating layers include, but are not limited to MgO, $Al_2O_3$, $ZrO_2$, $MnO_2$, $CeO_2$, $TiO_2$, ZnO, $SiO_2$, $SnO_2$, $Cr_2O_3$, and a combination of any two or more thereof. Illustrative metal fluorides include, but are not limited to $AlF_3$, $CaF_2$, $CeF_3$, ZrF, $ZrF_2$, $ZrF_3$, $ZrF_4$, $LaF_3$, $SrF_2$ and a combination of any two or more thereof. Illustrative metal phosphates include, but are not limited to $Li_3PO_4$, $AlPO_4$, $YPO_4$, $Li_3PO_4$, $FePO_4$, $Mg_3(PO_4)_2$, $Zn_3(PO_4)_2$, $Ca_3(PO_4)_2$, $Co_3(PO_4)_2$, $Ni_3(PO_4)_2$, and a combination of any two or more thereof. Illustrative conductive polymers include, but are not limited to, polyacetylenes, polypyrroles, polyparaphenylenes, polythiophene, polyfurans, polythianaphthenes, polyanilines, and their derivatives or copolymers, and a combination of any two or more thereof.

Provided herein, further, is a method for preparing the cathode material for lithium- or sodium-ion batteries. The method includes preparing at least two transition metal solutions the core composition and the surface composition. The core composition solution (Sol1) may contain an appropriate proportion of Ni, Mn, and Co; and the surface composition solution (Sol2) may contain an appropriate proportion of Ni, Mn, and Co; where the content of Co in Sol2 is higher than that in Sol1, and the content of Co in the two solutions is less than 50 mol % of all metals.

After preparing the two solution, a co-precipitation method is conducted to prepare the part/whole particle precursor having a concentration gradient. Sol1 and Sol2 are mixed at a ratio from 100 v %:0 v % to 0 V %:100 v % with gradual change and by adding a chelating agent and a precipitant agent to a reactor at the same time, wherein the concentration of Ni is constant or slightly decreased from the core to the surface part, and the concentrations of Mn is constant or gradually decreased from the core to the surface part; and the concentrations of Co is partly or continuously increased from the core to the surface part. The gradient precursor is then obtained by collecting and drying the obtained precipitates to obtain the particle precursors. Finally, the gradient cathode material is prepared by mixing the particle precursor with a lithium/sodium salt and then heat-treating that mixture to form the cathode active material.

In any embodiments, the method includes preparing solutions for the core composition (Sol1) and surface composition (Sol2). Sol1 may contain an appropriate ratio of Ni, Mn, and Co; and Sol2 may contain an appropriate ratio of Ni, Mn, and Co. The metal solution for the core and the metal solution for the surface part may be prepared by adding a nickel salt, a cobalt salt, and a manganese salt to a solvent. In some embodiments, the solvent is water. The salts may be those of metal hydroxides, metal halides, metal sulfates, metal sulfites, metal chlorates, metal nitrates, metal acetates, metal phosphates, metal citrates, metal carbonates, metal oxalates, or a combination of thereof, which can be dissolved in water or other solvents, without particular limitation. The concentration of Ni, Mn, and Co may range from about 0.1 M to 10.0 M. This includes about 0.1 M, 0.2 M, 0.3 M, 0.4 M, 0.5 M, 1.0 M, 1.5 M, 2.0 M, 2.5 M, 3.0 M, 3.5 M, 4.0 M, 4.5 M, 5.0 M, 6 M, 7 M, 8 M, 9 M, and 10 M, and appropriate ratios within these ranges. The solutions in different tanks are pumped to a reactor over the appropriate time and proportion, wherein the chelating agent and metal salt solution are added in appropriate proportion. A precipitating agent is pumped into the reactor simultaneously to obtain a precipitate of a precursor particle with part or continuous gradient concentration.

The concentration of Ni, Mn, and Co not only depends on the concentration of the metal solution but also on the mixing ratio thereof; the mixing ratio of the two solutions can be chosen to be about 100%:0 to 0:100%, including 100%:0, 95%:5%, 90%:10%, 85%:15%, 80%:20%, 75%:25%, 70%:30%, 65%:35%, 60%:40%, 55%:45%, 50%:50%, 45%:55%, 40%:60%, 35%:65%, 30%:70%, 25%:75%, 20%:80%, 15%:85%, 10%:90%, 5%:95%, 0:100%, and appropriate ratios within these ranges.

Illustrative chelating agents include, but are not limited to, ammonia salts or a salt containing ammonium or alkylammonium ions. Some such chelating agents include, but are not limited to, ammonium sulfate, ammonium nitrate, or a combination thereof. A concentration of chelating agent may vary from about 0.1 M to 10 M, including 0.5 M, 1.0 M, 1.5 M, 2.0 M, 2.5 M, 3.0 M, 3.5 M, 4.0 M, 4.5 M, 5.0 M, 6.0 M, 7.0 M, 8.0 M, 9.0 M, 10 M and the appropriate ratio within this range. A ratio of chelating agent to the Sol1/Sol2 may vary from about 0.1 to 5, and may be 0.1, 0.2, 0.3, 0.4, 0.5, 0.6, 0.7, 0.8, 0.9, 1, 1.5, 2, 2.5, 3, 3.5, 4, 4.5, 5, and the appropriate concentration within this range.

Illustrative precipitant agents include, but are not limited to, sodium hydroxide, sodium carbonate, and sodium oxalate. A concentration of precipitant agent may vary from about 0.1 M to 10 M, including 0.5 M, 1.0 M, 1.5 M, 2.0 M, 2.5 M, 3.0 M, 3.5 M, 4.0 M, 4.5 M, 5.0 M, 6.0 M, 7.0 M, 8.0 M, 9.0 M, 10 M, and appropriate concentrations within this range. The content of precipitant agent in the reactor may be controlled by pH controller, and the pH value may be set in the range of 9-12 (defined at room temperature), including 9.0, 9.5, 10.0, 10.5, 11.0, 11.5, 12.0 and the appropriate value within this range.

After collection of the precipitates, it is washed and dried and stored in a protective gas environment.

Conversion of the precursor materials obtained from the precipitation may be accomplished by mixing the precursor with a lithium or sodium source and heating treating the materials to form the oxides. Accordingly, in some embodiments, where the cathode material include $LiNi_xMn_yCo_zO_2$ for a lithium-ion battery; the method includes mixing the precursor with a lithium salt, and heat-treating the mixture at a temperature of about 300° C. to about 1200° C. The lithium salt may be selected from lithium hydroxide, lithium carbonate, lithium nitrate, lithium chloride, lithium fluoride, lithium oxide, or a combination of thereof; and a ratio of the lithium salt and the metal of the precursor may vary from 0.9 to 1.1, including 0.9, 0.91, 0.92, 0.93, 0.94, 0.95, 0.96, 0.97, 0.98, 0.99, 1.00, 1.01, 1.02, 1.03, 1.04, 1.05, 1.06, 1.07, 1.08, 1.09, 1.10 and the appropriate ratio within this range. The heat-treating may include pre-sintering at a temperature of about 300° C. to about 600° C., maintaining this temperature for about 2 to 10 hours, and then sintering at a temperature of about 680 C to about 1200° C. for about 5 to 30 hours. The sintering atmosphere may be selected from oxygen, air, and a combination of thereof.

Where the cathode material includes a cathode material of $NaNi_xMn_yCo_zO_2$ for a sodium-ion battery, the method includes mixing the precursor and sodium salt with appropriate ratio, and heat-treating the mixture at a temperature of about 300° C. to about 1200° C. The sodium salt may be selected from sodium hydroxide, sodium carbonate, sodium nitrate, sodium chloride, sodium fluoride, sodium oxide, and the combination of thereof the ratio of the sodium salt and the metal of the precursor may vary from 0.5 to 1.1, including 0.5, 0.6, 0.7, 0.8, 0.9, 1.00, 1.01, 1.02, 1.03, 1.04, 1.05, 1.06, 1.07, 1.08, 1.09, 1.10 and appropriate ratios within this range. The heat-treating may include pre-sintering at a temperature of about 300° C. to about 600° C., maintaining this temperature for about 2 to 10 hours, and then sintering at a temperature of about 680 C to about 1200° C. for about 5 to 30 hours. The sintering atmosphere may be selected from oxygen, air, and a combination of thereof.

Where the cathode material is a Li- and Mn-rich cathode expressed by $\delta Li_2TmO_3 \cdot (1-\delta)LiTm'O_2$, where Tm is one or more of Ni, Mn, and Co; and Tm' is Co and, optionally, Ni and/or Mn, and $0<\delta<1$, the cathode material may be characterized by the part or whole particle having a concentration gradient, wherein at least two elements exhibit a gradual change in concentration across the part or whole particle, from the center part to the surface part of the particle as shown in FIGS. 1-6. More specifically, the Co concentration increases along the vector radius. The method includes mixing the precursor and lithium salt with appropriate ratio, heat-treating at a temperature range of about 300° C. to about 1200° C., and natural cooling down or quenching. The lithium salt may be selected from lithium hydroxide, lithium carbonate, lithium nitrate, lithium chloride, lithium fluoride, lithium oxide and the combination of thereof; the ratio of the lithium salt and the metal of the precursor may vary from 1.0 to 1.3, including 1.0, 1.02, 1.04, 1.06, 1.08, 1.10, 1.12, 1.14, 1.16, 1.18, 1.20, 1.22, 1.24, 1.26, 1.28, 1.30 and the appropriate ratio within this range. The heat-treating may include pre-sintering at a temperature of about 300° C. to about 600° C., maintaining this temperature for about 2 to 10 hours, and then sintering at a temperature of about 680 C to about 1200° C. for about 5 to 30 hours. The sintering atmosphere may be selected from oxygen, air, and a combination of thereof. After sintering, the temperature may be cooled down naturally or cooled down by quenching.

Further, in any of the embodiments of the electrochemical device, it may be a lithium-ion battery or sodium ion battery.

Provided herein is a cathode material expressed as $LiNi_xMn_yCo_zO_2$ or $NaNi_xMn_yCo_zO_2$ with part or the whole particle concentration gradient, wherein at least two of the Ni, Mn, and Co gradually change concentration in the part or the whole particle along the vector radius. The concentration of Ni, Mn, and Co in the cathode not only depends on the concentration of the metal solution but also on the mixing ratio thereof; the cathode material may be characterized as having a Ni concentration that is either constant or slightly decreased along a vector radius of the particle, a concentration of Mn that is either constant or partly/continuously decreased along the vector radius; and a concentration of Co that is partly/continuously increases along the vector radius.

The concentration gradient refers to the concentration changes along the vector radius. The concentration of each metal except Li exists with concentration distribution, which is changed gradually from the core of particle to the surface of the particle. In some embodiments, at least two of the Ni, Mn, and Co change in concentration from 0.1 to 30 mol %, preferably 0.1 to 20 mol %, more preferably 1 to 10 mol % per 0.1 μm, along the vector radius. The concentration change of "mol % per 0.1 μm" refers to the change rate of each metal molar concentration within 0.1 μm. In the present invention, the particle core refers to the range within the diameter 0.1 μm from the center of the cathode material particle, and the particle surface part refers to the range within the diameter 0.2 μm from the outer most of the particle.

In some embodiments, the $LiNi_xMn_yCo_zO_2$ or $NaNi_xMn_yCo_zO_2$ particles having a core-gradient structure, wherein the concentration of Ni is constant; the concentration of Mn is partly decreased; the concentration of Co partly increases all along the vector radius. The concentration of Ni fixed in a certain value that may be selected from 50 mol % to 100 mol % in any region/area of the particle, the concentration of Mn may be chosen in the range of 0 to 33 mol % in any region/area of the particle, and the concentration of Co may be chosen in the range of 0 to 33 mol % in any region/area of the particle.

In some embodiments, the $LiNi_xMn_yCo_zO_2$ or $NaNi_xMn_yCo_zO_2$ includes a core-shell structure, wherein the concentration of Ni is constant through the whole particle; the concentration of Mn keeps constant in the core and start gradually decreasing near the surface of the particle; the concentration of Co keeps constant in the core and starts gradually increasing near the surface of particle. In such embodiments, the concentration of Ni is fixed at a value from 50 mol % to 100 mol % in any areas of the particle, the concentration of Mn may be chosen in the range of 0 to 33 mol % in any areas of the particle, however, it is present at the center and generally decreasing toward the surface, and the concentration of Co may be chosen in the range of 0 to 33 mol % in any areas of the particle, however, it is present at the surface and less toward the center.

In some embodiments, the $LiNi_xMn_yCo_zO_2$ or $NaNi_xMn_yCo_zO_2$ includes a two-slope concentration gradient, wherein the concentration of Ni is fixed at a value from 50 mol % to 100 mol % in any areas of the particle; the concentration of Mn is gradually decreased with two slopes (i.e. there are 2 different rates of change of the Mn concentration) from the core to the surface of the particle; the concentration of Co is continuously increased with two slopes (i.e. there are 2 different rates of change of the Co concentration) from the core to the surface of the particle. In such embodiments, the concentration of Ni may be chosen in the range of 33 mol % to 100 mol % in any areas of the particle, the concentration of Mn may be chosen in the range of 0 to 33 mol % in any areas of the particle, and the concentration of Co may be chosen in the range of 0 to 33 mol % in any areas of the particle.

In some embodiments, the $LiNi_xMn_yCo_zO_2$ or $NaNi_xMn_yCo_zO_2$ includes a three element concentration gradient structure wherein the concentration of Ni is slightly decreased from the core to the surface of the particle; the concentration of Mn is gradually decreased from the core to the surface; the concentration of Co is continuously increased from the core to the surface of the particle; the concentration of Ni is fixed at a value from 50 mol % to 100 mol % in any areas of the particle, the concentration of Mn may be chosen in the range of 0 to 33 mol % in any areas of the particle, and the concentration of Co may be chosen in the range of 0 to 33 mol % in any areas of the particle.

In some embodiments, the $LiNi_xMn_yCo_zO_2$ or $NaNi_xMn_yCo_zO_2$ includes a concentration gradient structure with constant Mn wherein the concentration of Ni is slightly decreased from the core to the surface of the particle; the concentration of Mn is constant through the whole particle; the concentration of Co is continuously increases from the core to the surface of the particle; the concentration of Ni is fixed at a value from 50 mol % to 100 mol % in any areas of the particle, the concentration of Mn may be chosen in the range of 0 to 33 mol % in any areas of the particle, and the concentration of Co may be chosen in the range of 0 to 33 mol % in any areas of the particle.

In some embodiments, the $LiNi_xMn_yCo_zO_2$ or $NaNi_xMn_yCo_zO_2$ includes a full concentration gradient structure wherein the concentration of Ni is slightly decreased from the core to the surface of the particle; the concentration of Mn is continuously decreased from the core to the surface of the particle; the concentration of Co starts with a certain concentration (less than 20%) and continuously increased from the core to the surface of the particle; the concentration of Ni may be chosen in the range of 50 mol % to 100 mol % in any areas of the particle, the concentration of Mn may be chosen in the range of 0 to 33 mol % in any areas of the particle, and the concentration of Co may be chosen in the range of 0 to 33 mol % in any areas of the particle.

In any embodiments, the Co gradually increases going toward the surface of the particle.

In any embodiments, when the concentration of Ni in the gradient cathode decrease it could be with one slope or more (i.e. one rate of change, or more). When the concentration of Mn in the gradient cathode decrease, it could be using one slope or more (i.e. one rate of change, or more). When the concentration of Co increases in the gradient cathode, it could be using one slope or more (i.e. one rate of change, or more).

In any of the above embodiments, the cathode material described herein may contain a dopant cation, wherein the dopant cation may include Mg, Al, Ca, Cr, V, Fe, Cu, Zn, Zr, Nb, Mo, Ru, Ir, La, or a combination thereof. The dopant could be present as a constant concentration across the vector radius of the particle, or it may be present only at the surface of the particle (surface doping). The particle surface part refers to the range within the diameter 0.2 μm from the outer most of the particle. When present, the dopant cation content in the cathode material is present at the range of 0.001 wt % to 10 wt %.

In such embodiments, the cathode material described in present invention may contain coating layer comprising a metal oxide, a metal fluoride, a metal phosphate, a conductive carbon coating, or a combination of any two or more thereof, wherein a metal oxide may be selected from the group consisting of $MgO$, $Al_2O_3$, $ZrO_2$, $MnO_2$, $CeO_2$, $TiO_2$, $ZnO$, $SiO_2$, $SnO_2$, $Cr_2O_3$, and a combination of any two or more thereof; a metal fluoride may be selected from the group consisting of $AlF_3$, $CaF_2$, $CeF_3$, $ZrF$, $ZrF_2$, $ZrF_3$, $ZrF_4$, $LaF_3$, $SrF_2$ and a combination of any two or more thereof; a metal phosphate may be selected from the group consisting of $Li_3PO_4$, $AlPO_4$, $YPO_4$, $Li_3PO_4$, $FePO_4$, $Mg_3(PO_4)_2$, $Zn_3(PO_4)_2$, $Ca_3(PO_4)_2$, $Co_3(PO_4)_2$, $Ni_3(PO_4)_2$, and a combination of any two or more thereof; a conductive polymer may be selected from the group consisting of polyacetylenes, polypyrroles, polyparaphenylenes, polythiophene, polyfurans, polythianaphthenes, polyanilines, and their derivatives or copolymers, and a combination of any two or more thereof.

Further, the present invention provides electrochemical devises including the cathode active material according to the present invention.

In some embodiments, the electrochemical devises may be lithium-ion batteries. The lithium-ion battery may include a cathode including the cathode active material having the above composition, an anode, and a separator existing between thereof. Further, it may include an electrolyte, which is immersed in the cathode, the anode, and the separator. The anode material may be a material which can reversibly absorb or release lithium-ions, preferably, for example, a material including artificial graphite, natural graphite, graphitized carbon fiber amorphous carbon; and lithium metal also can be used as an anode active material. The electrolyte may be a liquid electrolyte containing lithium salts and non-aqueous organic solvent, or polymer gel electrolyte.

In some embodiments, the electrochemical device may be a sodium ion battery. The sodium ion battery may include a cathode including the cathode active material having the above composition, an anode, and a separator existing between thereof. Further, it may include an electrolyte, which is immersed in the cathode, the anode, and the separator. The anode material may be a material which can reversibly absorb or release sodium ions, preferably, for example, a material including hard carbon, artificial graphite, natural graphite, graphitized carbon fiber, and amorphous carbon; sodium metal also can be used as an anode active material. The electrolyte may be a liquid electrolyte containing sodium salts and non-aqueous organic solvent, or polymer gel electrolyte.

The present invention, thus generally described, will be understood more readily by reference to the following examples, which are provided by way of illustration and are not intended to be limiting of the present invention.

EXAMPLES

Example 1. The preparation of core-gradient cathode materials. The core-gradient cathode is characterized that the concentration of Ni is constant, the concentration of Mn is partly decreased from the core to surface, the concentration of Co is partly increased from the core to the surface. The concentration of the Ni is from 50 mol % to 100 mol % in any areas of the particle, the concentration of the Mn is from 0 to 33 mol % in any areas of the particle, and the concentration of the Co is from 0 to 33 mol % in any areas of the particle. The preparation of the core-gradient cathode is accomplished by co-precipitation and sintering process.

A representative of the core-gradient cathode is described below. In a co-precipitation synthesis, the concentration gradient precursor was prepared from two metal solutions. The solution for preparing the core component contains Ni and Mn at a ratio of 80%:20%; and the solution for preparing the surface component contains Ni and Co at a ratio of 80%:20%; the concentration of two metal solutions is 2 M and prepared with sulphate salt; the volume of two metal solutions is 1.0 L.

The chelating agent was prepared by mixing 1.2 L purified water and 300 ml 5 M aqueous ammonia solution in a co-precipitation reactor. The reaction temperature was set at 60° C., the rotation speed was set at 1000 rpm, and nitrogen gas protection was applied in the whole process.

The aqueous metal solution for preparing the core and the aqueous metal solution for preparing the surface part were mixed in a total amount of 50%:50%. The metal solution for the core was directly injected into a 4 L reactor at 0.06 L/hour, and simultaneously the metal solution for surface part was supplied into the reactor at the rate of 0.06 L/hour. Further, 5 M ammonia solution was continuously injected into the reactor at the rate of 0.03 L/hour. Further, the content of precipitant agent (NaOH) was controlled by pH value. A 5 M NaOH aqueous solution was supplied to maintain pH in the reactor at 11. In the whole synthesis process, the stirring speed of the reactor was kept at 1000 rpm, and the reaction temperature was set at 60° C. The co-precipitation reaction was conducted around 20 hours; hereafter, the precipitant was kept at the steady state for 4 hours to obtain a co-precipitated compound with higher density. Then the compound was filtered, washed with water, and dried with 110° C. with nitrogen gas for 15 hours to obtain a cathode material precursor.

The precursor was mixed with lithium hydroxide at a ratio of 1:1.03, and then heated to 450° C. at a rate of 2° C./min, and then maintained at 450° C. for 5 hours followed by calcining at 750° C. for 12 hours to obtain a final cathode material particle.

According to the synthesis process, a representative concentration of Example 1 is shown in FIG. 1. The Ni concentration is constant from the core to the surface and kept at 80 mol %, the Mn concentration is decreased from 20 mol % to 0 from the core to surface; and the Co concentration is increased from 0 to 20 mol % from the particle center to surface.

Example 2. The preparation of core-shell cathode materials. The core-shell structure is characterized that the concentration of Ni is constant through the whole particle; the concentration of Mn is constant in the core and starts gradually decreasing near the surface of the particle; the concentration of Co is constant in the core and gradually increases near the surface of the particle. The concentration of the Ni is from 50 mol % to 100 mol % in any areas of the particle, the concentration of the Mn is from 0 to 33 mol % in any areas of the particle, and the concentration of the Co is from 0 to 33 mol % in any areas of the particle. The preparation of the core-shell cathode is accomplished by co-precipitation and sintering process.

A representative of the core-shell cathode is described below. In a co-precipitation synthesis, the concentration gradient precursor was prepared from two metal solutions. The solution for preparing the core component contains Ni and Mn at a mol ratio of 80%:20%; and the solution for preparing the surface component contains Ni and Co at a mol ratio of 80%:20%; the concentration of two metal solutions is 2 M and prepared with sulphate salt; the volumes of two metal solutions are 1.6 L and 0.4 L, respectively.

The initial chelating agent is prepared by mixing 1.2 L purified water and 300 ml 5 M aqueous ammonia solution in a co-precipitation reactor. The reaction temperature was set at 60° C., the rotation speed was set at 1000 rpm, and nitrogen gas protection was applied in the whole synthesis process.

The metal solution for core composition and the metal solution for surface composition were mixed in a total amount of 80%:20%. The metal solution for the core was directly injected into the 4 L reactor at 0.06 L/hour. After 15 hours of reaction, the metal solution for the surface was supplied into the metal solution for the core at the rate of 0.03 L/hour. Further, 5 M ammonia solution was continuously injected into the reactor at the rate of 0.03 L/hour. Further, the content of precipitant agent, NaOH, was controlled by pH value. 5 M NaOH aqueous solution was supplied to maintain pH in the reactor at 11. In the whole synthesis process, the stirring speed of the reactor was kept at 1000 rpm, and the reaction temperature was set at 60° C. The co-precipitation reaction was conducted for about 20 hours; after which the precipitant was kept at the steady state for 4 hours to obtain a co-precipitated compound with higher density. The compound was then filtered, washed with water, and dried with 110° C. with nitrogen gas for 15 hours to obtain a cathode material precursor.

The precursor was mixed with lithium hydroxide at a ratio of 1:1.03, and then heated to 450° C. at a rate of 2° C./min, and then maintained at 450° C. for 5 hours followed by calcining at 750° C. for 12 hours to obtain a final cathode material particle.

Figure 2:
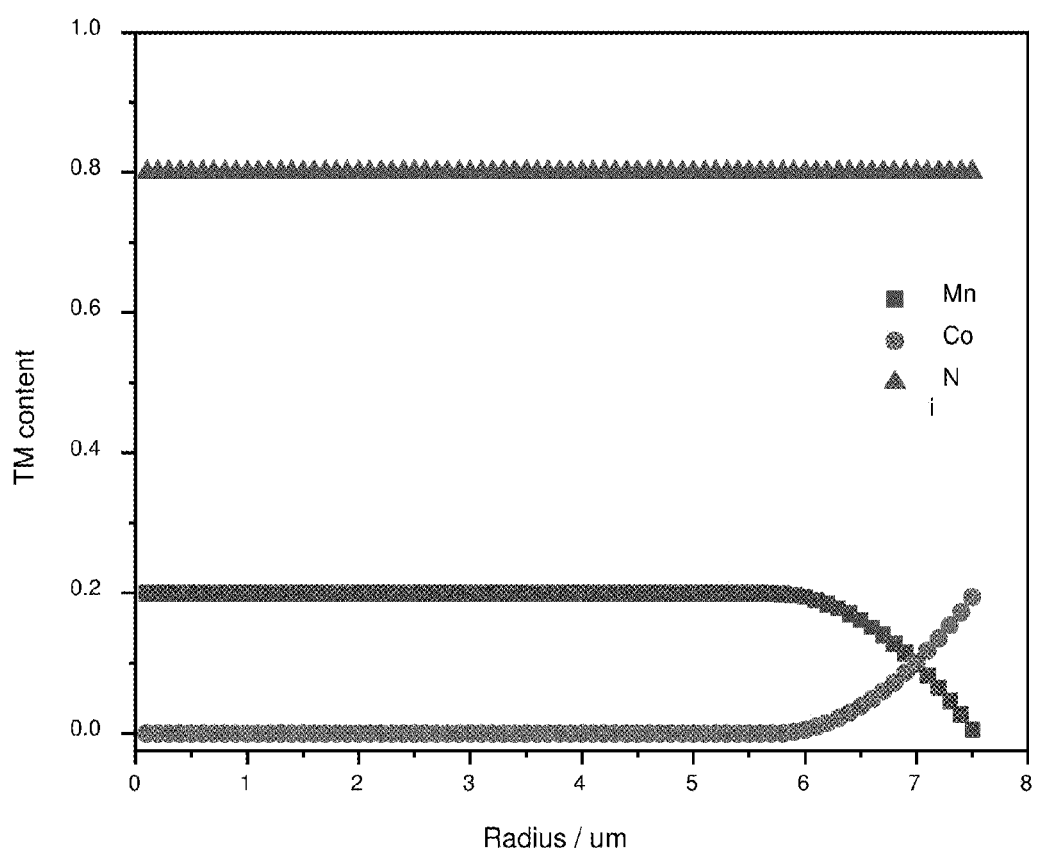
FIG. 2 depicts a representative concentration of core-shell cathode. The Ni concentration is constant from the core to the surface the Mn concentration is kept constant in the core, and gradually start decreasing near the surface of the particle; the Co concentration is kept at less than 1% (from 0 to 1 mol %) in the core, and start gradually increasing near the surface of the particle.

According to the process, a representative concentration of Example 2 is shown in FIG. 2. The Ni concentration is constant from the core to the surface and kept at 80%, the Mn concentration is kept at 20% in the core, and starts gradually decreasing from 20% to 0 near the surface of the particle; the Co concentration is kept at 0 in the core, and starts gradually decreasing from 0 to 20% near the surface of the particle.

Example 3. The preparation of two-slope concentration gradient cathode materials. The two-slope concentration gradient is characterized that the concentration of Ni is constant through the whole particle; the concentration of Mn is gradually decreased with two slopes from the particle center to the surface; the concentration of Co continuously increases with two slopes from the particle center to the surface. The concentration of the Ni is from 33% to 100% in any areas of the particle, the concentration of the Mn is from 0 to 33% in any areas of the particle, and the concentration of the Co is from 0 to 33% in any areas of the particle. The preparation of two-slope concentration gradient cathode is accomplished by co-precipitation and sintering process.

A representative of the two-slope concentration gradient cathode is described below. In a co-precipitation synthesis, the concentration gradient precursor was prepared from two metal solutions. The solution for preparing the core component contains Ni and Mn at a ratio of 80%:20%; and the solution for preparing the surface component contains Ni and Co at a ratio of 80%:20%; the concentration of two metal solutions is 2 M and prepared with sulphate salt; the volumes of two metal solutions are 1.2 L and 0.8 L, respectively.

The chelating agent was prepared by mixing 1.2 L purified water and 300 ml 5 M aqueous ammonia solution in a co-precipitation reactor. The reaction temperature was set at 60° C., the rotation speed was set at 1000 rpm, and nitrogen gas protection was applied in the whole synthesis process.

The metal solution for the core and the metal solution for the surface were mixed in a total amount of 66%:34% in total. The metal solution for the core was directly injected into the 4 L reactor at 0.06 L/hour. At the same time, the metal solution for surface was supplied into the solution for core composition at the rate of 0.03 L/hour. After 12 hours of reaction, the metal solution for surface was supplied into the solution for core composition at the rate of 0.06 L/hour. Further, 5 M ammonia solution was continuously injected into the reactor at the rate of 0.03 L/hour. Further, the content of precipitant agent, NaOH, was controlled by pH value. 5 M NaOH aqueous solution was supplied to maintain pH at 11 in the reactor. In the whole synthesis process, the stirring speed of the reactor was kept at 1000 rpm, and the reaction temperature was set at 60° C. The co-precipitation reaction was conducted around 20 hours, after which the precipitant was maintained at the steady state for 4 hours to obtain a co-precipitated compound with higher density. Soon afterwards, the compound was filtered, washed with water, and dried with 110° C. with nitrogen gas for 15 hours to obtain a cathode material precursor.

The precursor was mixed with lithium hydroxide at a ratio of 1:1.03, and then heated to 450° C. at a rate of 2° C./min, and then maintain at 450° C. for 5 hours followed by calcining at 750° C. for 12 hours to obtain a final cathode material particle.

Figure 3:
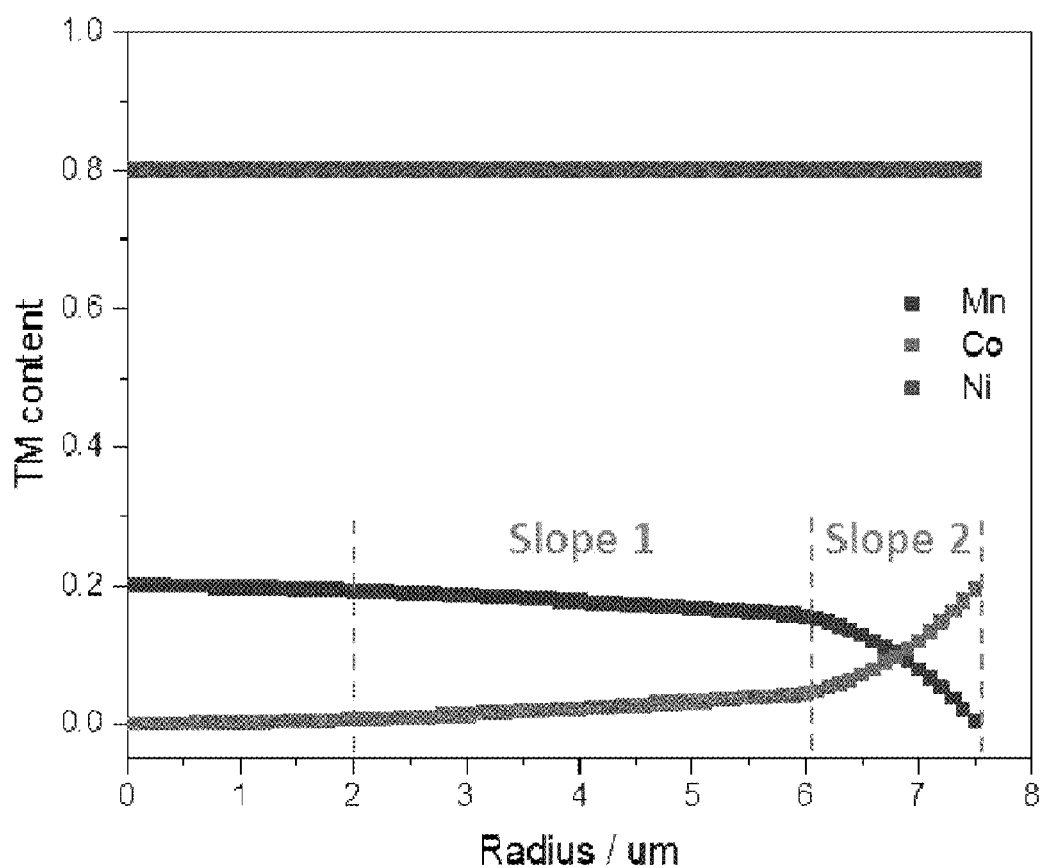
FIG. 3 depicts a representative concentration of two-slope concentration gradient cathode material. The Ni concentration is constant from the core to the surface, the Mn concentration is gradually decreased with two-slope from the core to the surface; the Co concentration is gradually increased with two-slope from the core to the surface.

A representative concentration of Example 3 is shown in FIG. 3. The Ni concentration is constant from the core to the surface and kept at 80%, the Mn concentration is gradually decreased from 20% to 0 with two-slope; the Co concentration is gradually increased from 0 to 20% with two-slope.

Example 4. The preparation of three-element gradient cathode materials. The three elements concentration gradient cathode is characterized that the concentration of Ni is slightly decreased from the particle center to the surface; the concentration of Mn is gradually decreased from the particle center to the surface; the concentration of Co is continuously increases from the particle center to the surface. The concentration of the Ni is from 33% to 100% in any areas of the particle, the concentration of the Mn is from 0 to 33% in any areas of the particle, and the concentration of the Co is from 0 to 33% in any areas of the particle. The preparation of two-slope concentration gradient cathode is accomplished by co-precipitation and sintering process.

A representative three-element gradient cathode is described below. In a co-precipitation synthesis, the concentration gradient precursor was prepared by two metal solutions. The solution for preparing the core component contains Ni and Mn at a ratio of 85%:15%; and the solution for preparing the surface component contains Ni and Co at a ratio of 76%:24%; the concentration of two metal solutions is 2 M and prepared with sulphate salt; the volumes of two metal solutions both are 1.0 L.

The chelating agent was prepared by mixing 1.2 L purified water and 300 ml 5 M aqueous ammonia solution in a co-precipitation reactor. The reaction temperature was set at 60° C., the rotation speed was set at 1000 rpm, and nitrogen gas protection was applied in the whole synthesis process.

The metal aqueous solution for preparing the core and the metal aqueous solution for preparing the surface part were mixed in a total amount of 50%:50%. The metal solution for the core was directly injected into the 4 L reactor at 0.06 L/hour. At the same time, the metal solution for surface part was supplied into the metal solution for core part at the rate of 0.03 L/hour. Further, 5 M ammonia solution was continuously injected into the reactor at the rate of 0.03 L/hour. Further, the content of precipitant agent, NaOH, was controlled by pH value. 5 M NaOH aqueous solution was supplied to maintain pH in the reactor at 11. In the whole synthesis process, the stirring speed of the reactor was maintained at 1000 rpm, and the reaction temperature was set at 60° C. The co-precipitation reaction was conducted around 20 hours, after which time the precipitant was maintained at the steady state for 4 hours to obtain a co-precipitated compound with higher density. The compound was then filtered, washed with water, and dried with 110° C. with nitrogen gas for 15 hours to obtain a cathode material precursor.

The precursor was mixed with lithium hydroxide at a ratio of 1:1.03, and then heated to 450° C. at a rate of 2° C./min, and then maintain at 450° C. for 5 hours followed by calcining at 750° C. for 12 hours to obtain a final cathode material particle.

Figure 4:
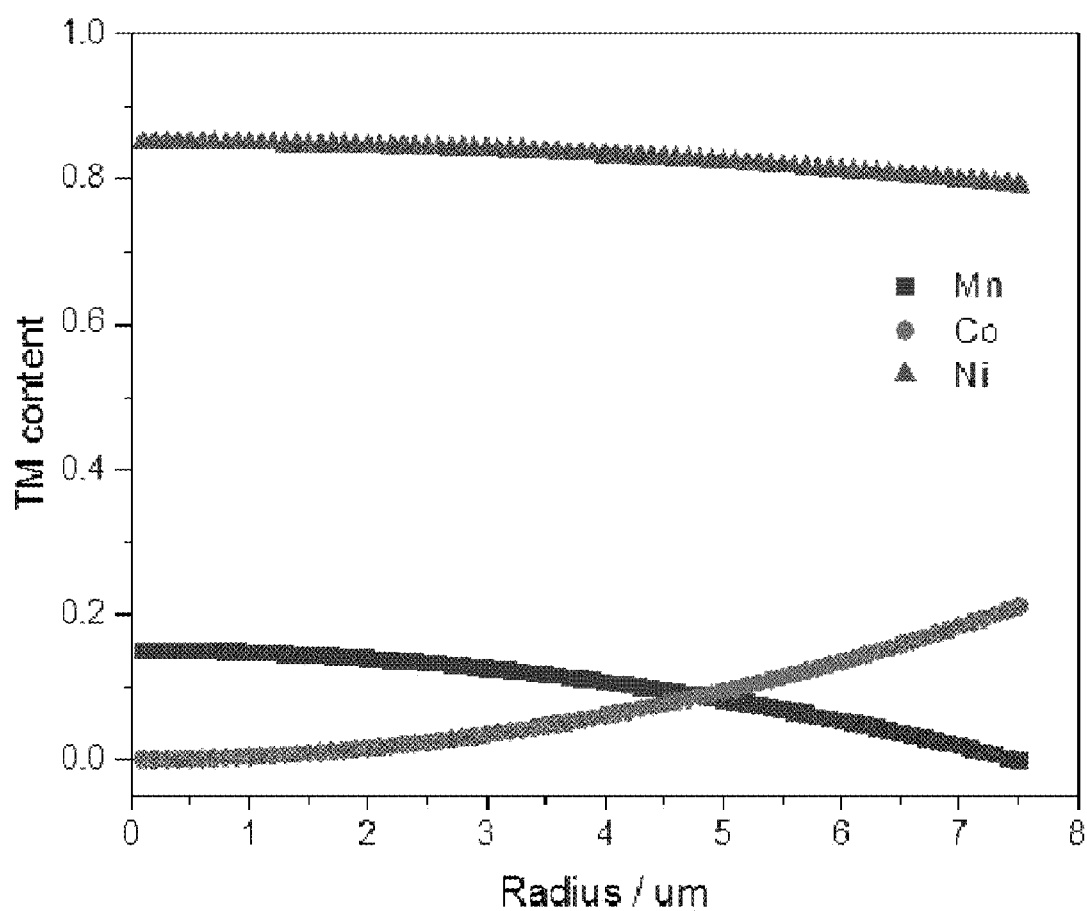
FIG. 4 depicts a representative concentration of three-element concentration gradient cathode materials. The Ni concentration is slightly decreased from the core to the surface, the Mn concentration is gradually decreased from the core to the surface; the Co concentration is gradually increased from the core to the surface.

According to the synthesis process, a representative concentration of example 4 is shown in FIG. 4. The Ni concentration is slightly decreased from 85% to 76% from the core to the surface, the Mn concentration is gradually decreased from 15% to 0 from core to surface; the Co concentration is gradually increased from 0 to 24% from core to surface.

Example 5. The preparation of the concentration gradient cathode materials with constant Mn content. The concentration gradient cathode with constant Mn is characterized that the concentration of Ni is slightly decreased from particle center to surface; the concentration of Mn is constant through the whole particle; the concentration of Co continuously increases from particle center to surface. The concentration of the Ni is from 33% to 100% in any areas of the particle, the concentration of the Mn is from 0 to 33% in any areas of the particle, and the concentration of the Co is from 0 to 33% in any areas of the particle. The preparation of two-slope concentration gradient cathode is accomplished by co-precipitation and sintering process.

A representative of the concentration gradient cathode with constant Mn is described below. In a co-precipitation synthesis, the concentration gradient precursor was prepared by two metal solutions. The solution for preparing the core component contains Ni and Mn at a ratio of 90%:10%; and the solution for preparing the surface component contains Ni, Mn and Co at a ratio of 70%:10%:20%; the concentration of two metal solutions is 2 M and prepared with sulphate salt; the volumes of two metal solutions both are 1.0 L.

The chelating agent was prepared by mixing 1.2 L purified water and 300 ml 5 M aqueous ammonia solution, and then put into a co-precipitation reactor. The reaction temperature was set at 60° C., the rotation speed was set at 1000 rpm, and nitrogen gas protection was applied in the whole synthesis process. The metal aqueous solution for preparing the core and the metal aqueous solution for preparing the surface part were mixed in a total amount of 50%:50%. The metal solution for the core was directly injected into the 4 L reactor at 0.06 L/hour. At the same time, the metal solution for surface part was supplied into the solution for core composition at the rate of 0.03 L/hour. Further, 5 M ammonia solution was continuously injected into the reactor at the rate of 0.03 L/hour. Further, the content of precipitant agent, NaOH, was controlled by pH value. 5 M NaOH aqueous solution was supplied to maintain pH at 11 in the reactor. In the whole synthesis process, the stirring speed of the reactor was kept at 1000 rpm, and the reaction temperature was set at 60° C. The co-precipitation reaction was conducted around 20 hours; hereafter, the precipitant was kept at the steady state for 4 hours to obtain a co-precipitated compound with higher density. The compound was then collected by filtration, washed with water, and dried with 110° C. with nitrogen gas for 15 hours to obtain a cathode material precursor.

The precursor was mixed with lithium hydroxide at a ratio of 1:1.03, and then heated to 450° C. at a rate of 2° C./min, and then maintain at 450° C. for 5 hours followed by calcining at 750° C. for 12 hours to obtain a final cathode material particle.

Figure 5:
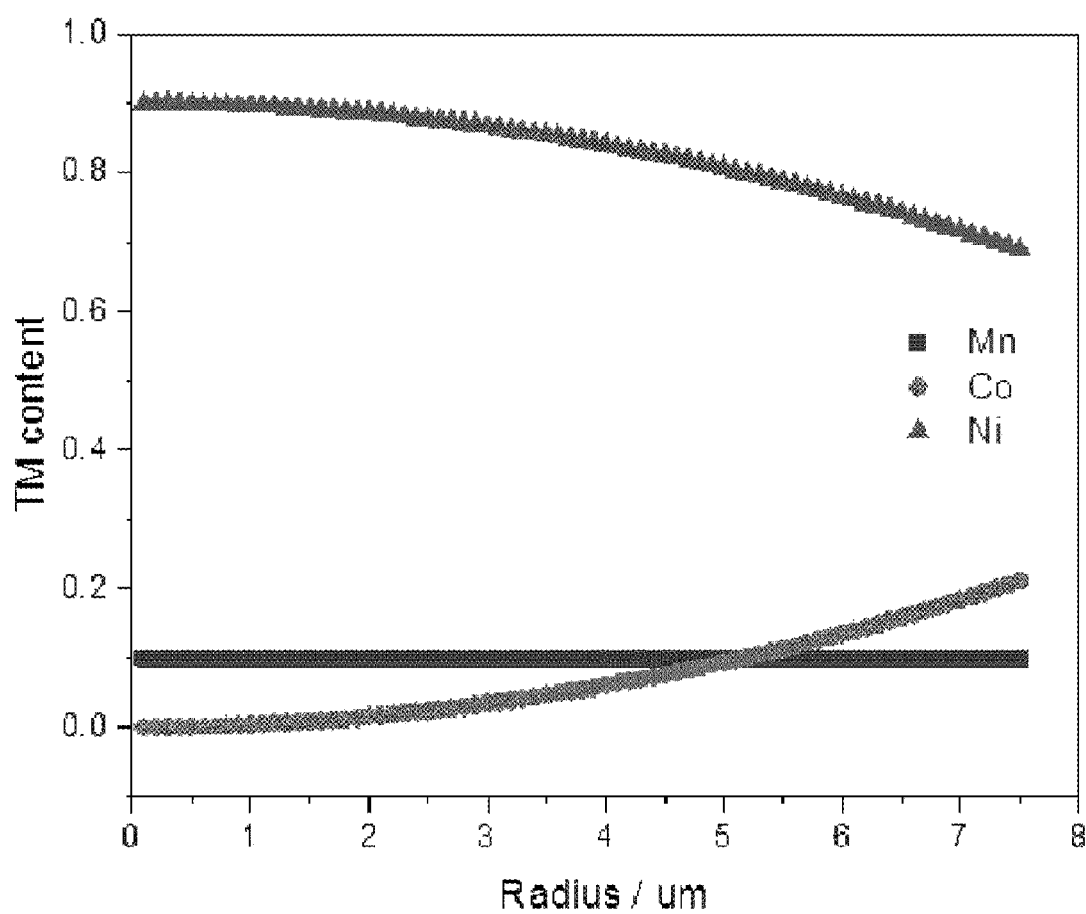
FIG. 5 depicts a representative concentration of the concentration gradient layered cathode materials with constant Mn. The Ni concentration is gradually decreased from core to the surface, the Mn concentration is constant through the whole particle; the Co concentration is gradually increased from the core the surface.

According to the synthesis process, a representative concentration of example 5 is shown in FIG. 5. The Ni concentration is gradually decreased from 90% to 70% from core to the surface, the Mn concentration is constant in the whole; the Co concentration is gradually increased from 0 to 20% with two gradient slopes.

Example 6. The preparation of full concentration gradient cathode materials. The full concentration gradient cathode is characterized that the concentration of Ni is slightly decreased from particle center to surface; the concentration of Mn is continuously decreased; the concentration of Co starts with a certain concentration (less than 20%) and continuously increases from particle center to surface. The concentration of the Ni is from 33% to 100% in any areas of the particle, the concentration of the Mn is from 0 to 33% in any areas of the particle, and the concentration of the Co is from 0 to 33% in any areas of the particle. The preparation of two-slope concentration gradient cathode is accomplished by co-precipitation and sintering process.

A representative of the full concentration gradient cathode is described below. In a co-precipitation synthesis, the concentration gradient precursor was prepared by two metal solutions. The solution for preparing the core component contains Ni, Mn and Co at a ratio of 80%:10%:10%; and the solution for preparing the surface component contains Ni and Co at a ratio of 70%:30%; the concentration of two metal solutions is 2 M and prepared with sulphate salt; the volumes of two metal solutions both are 1.0 L.

The chelating agent is prepared by mixing 1.2 L purified water and 300 ml 5 M aqueous ammonia solution in a co-precipitation reactor. The reaction temperature was set at 60° C., the rotation speed was set at 1000 rpm, and nitrogen gas protection was applied in the whole synthesis process.

The metal aqueous solution for preparing the core and the metal aqueous solution for preparing the surface part were mixed in a total amount of 50%:50%. The metal solution for the core was directly injected into the 4 L reactor at 0.06 L/hour. At the same time, the metal solution for surface part was supplied into the metal solution for core part at the rate of 0.03 L/hour. Further, 5 M ammonia solution was continuously injected into the reactor at the rate of 0.03 L/hour. Further, the content of precipitant agent, NaOH, was controlled by pH value. 5 M NaOH aqueous solution was supplied to maintain pH in the reactor at 11. In the whole synthesis process, the stirring speed of the reactor was kept at 1000 rpm, and the reaction temperature was set at 60° C. The co-precipitation reaction was conducted around 20 hours, after which time the precipitant was maintained at steady state for 4 hours to obtain a co-precipitated compound with higher density. The compound was then obtained by filtration, washed with water, and dried with 110° C. with nitrogen gas for 15 hours to obtain a cathode material precursor.

The precursor was mixed with lithium hydroxide at a ratio of 1:1.03, and then heated to 450° C. at a rate of 2° C./min, and then maintain at 450° C. for 5 hours followed by calcining at 750° C. for 12 hours to obtain a final cathode material particle.

Figure 6:
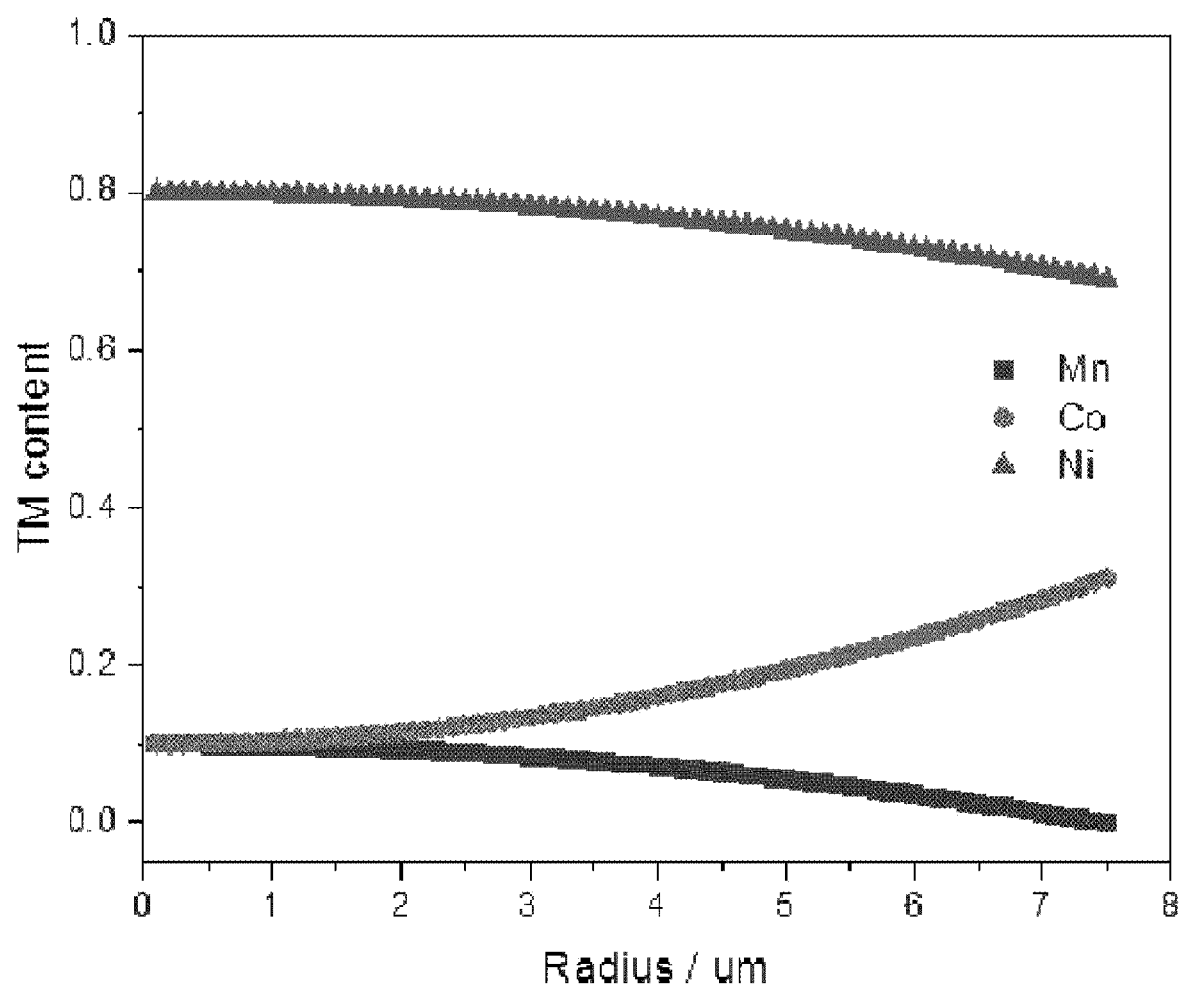
FIG. 6 depicts a representative concentration of full concentration gradient cathode materials. The Ni concentration is slightly decreased from the core to the surface, the Mn concentration is gradually decreased from the core to the surface; the Co concentration is gradually increased from the core to the surface.

According to the synthesis process, a representative concentration of example 6 is shown in FIG. 6. The Ni concentration is slightly decreased from 80% to 70% from the core to the surface, the Mn concentration is gradually decreased from 10% to 0 from core to surface; the Co concentration is gradually increased from 10% to 30% from core to surface.

Figure 7:
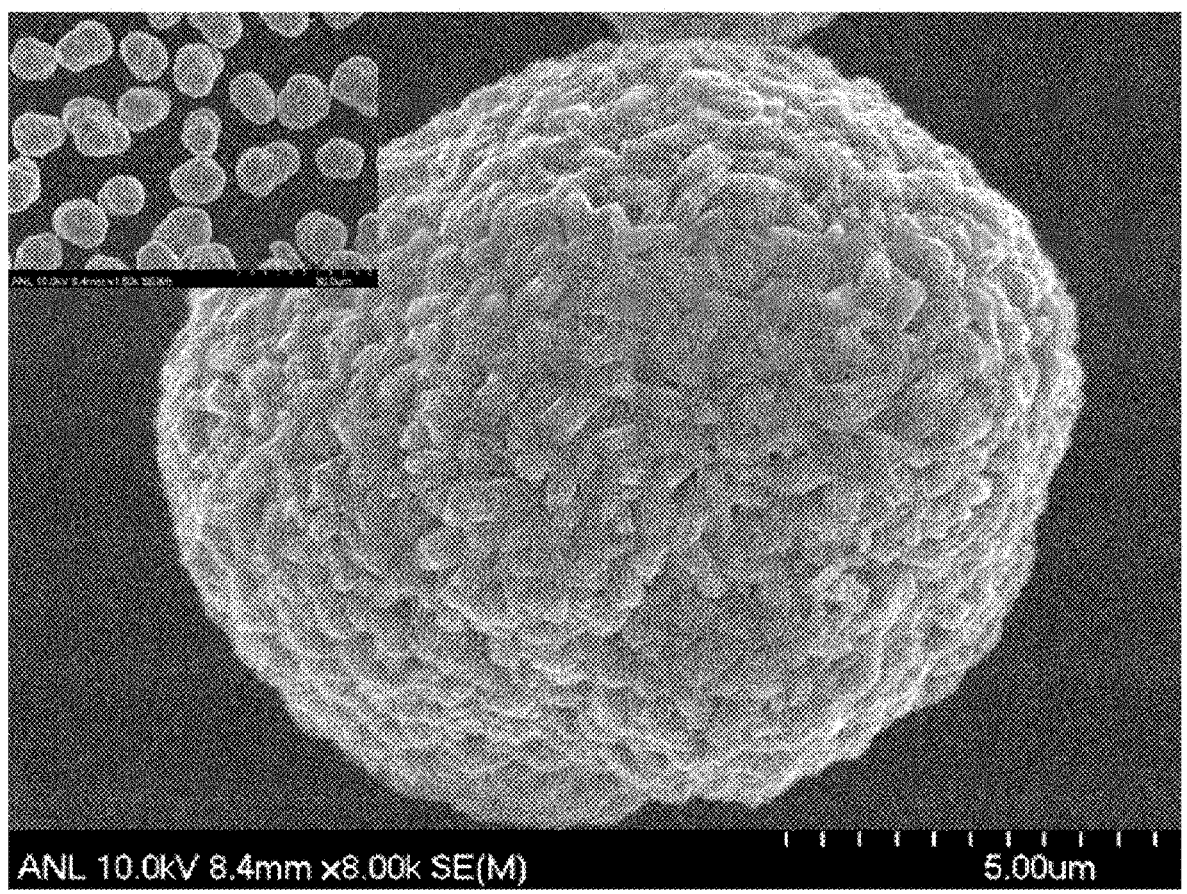
FIG. 7 depicts the scanning electron microscopy images of core-gradient concentration $LiNi_{0.8}Mn_{0.1}Co_{0.1}O_2$ showing a spherical and uniform particle size with an average size of around 12 μm.
Figure 8:
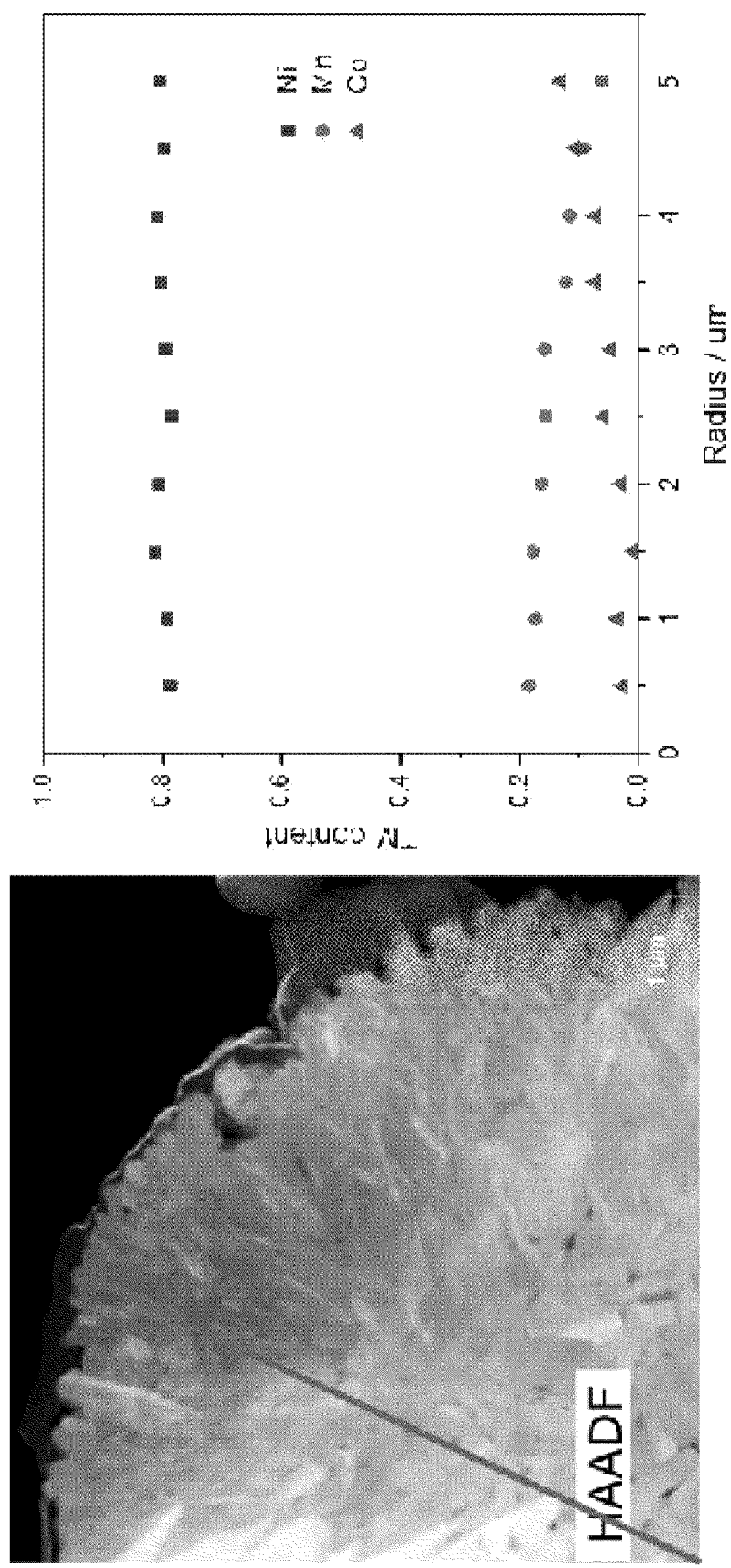
FIG. 8 depicts the confirmation of the formation of core-gradient concentration $LiNi_{0.8}Mn_{0.1}Co_{0.1}O_2$ (Example 1). Focused Ion Beam (FIB) and scanning transmission electron microscopy (STEM) mapping are employed to achieve the cross-section and elements analysis for Example 1. The results show that Ni concentration is constant from particle center to the surface and kept around 80 mol % based on all metals, the Mn concentration is gradually decreased from particle center to surface; and the Co concentration is gradually increased from the particle center to the surface.

Example 7. The morphological and composition characterization and phase structure of Example 1. The scan electron microscopy images of Example 1 is shown in FIG. 7. Example 1 shows a uniform particle size with an average size of around 12 μm. The transmission electron microscopy image (FIG. 8) confirms that the Ni content is constant in the whole particle, the Mn content gradually decreases from the core to the surface, and the Co content gradually increases from the core to the surface.

Example 8. Illustrative batteries using the core-gradient $LiNi_{0.8}Mn_{0.1}Co_{0.1}O_2$ (a representative sample of Example 1). For electrochemical testing, the core-gradient $LiNi_{0.8}Mn_{0.1}Co_{0.1}O_2$ were mixed with carbon black and PVDF at 80:10:10 wt % ratios and ground in a mortar. The well-mixed slurry was then cast onto a sheet of aluminum foil by a doctor blade on an automatic film coater. The film was dried in a vacuum oven at 80° C. for 12 hours and then transferred to a glove box filled with argon, before being punched out as circular, 14 mm in diameter, disks. 2032 type coin cells were used to prepare lithium half cells. Celgard 2325 separators and 1.2 M LiPF$_6$ in EC/EMC (3:7) electrolyte (GEN II) were used.

Figure 9:
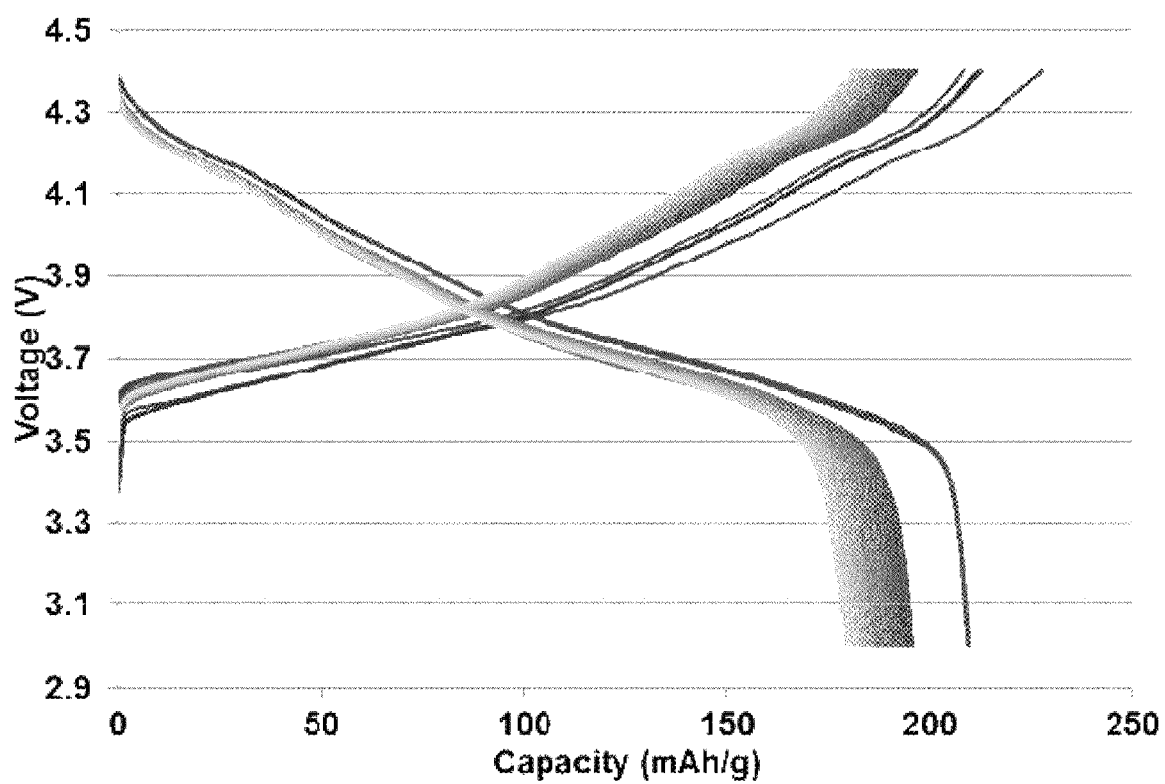
FIG. 9 depicts the charge/discharge voltage profiles of the first 3 cycles at a charge/discharge rate of C/10 and following 100 cycles at a charge/discharge rate of C/2. The cells were cycled between 3V and 4.4V.

Example 9. The electrochemical properties of the cells from Example 1. The half cells were assembled in glovebox with filled argon and then were operated by charge/discharge cycles within the voltage range of 3.0-4.4 V. FIG. 9 depicts the charge/discharge voltage profiles of the first 3 cycles at a charge/discharge rate of C/10 and following 100 cycles at a charge/discharge rate of C/2. As shown, the core-gradient LiNi$_{0.8}$Mn$_{0.1}$Co$_{0.1}$O$_2$ cathode shows a high initial specific capacity of 210 mAh g$^{-1}$ at the current rate of C/10 and an excellent capacity retention of over 94% at the current rate of C/2 after 100 cycles.

Figure 10:
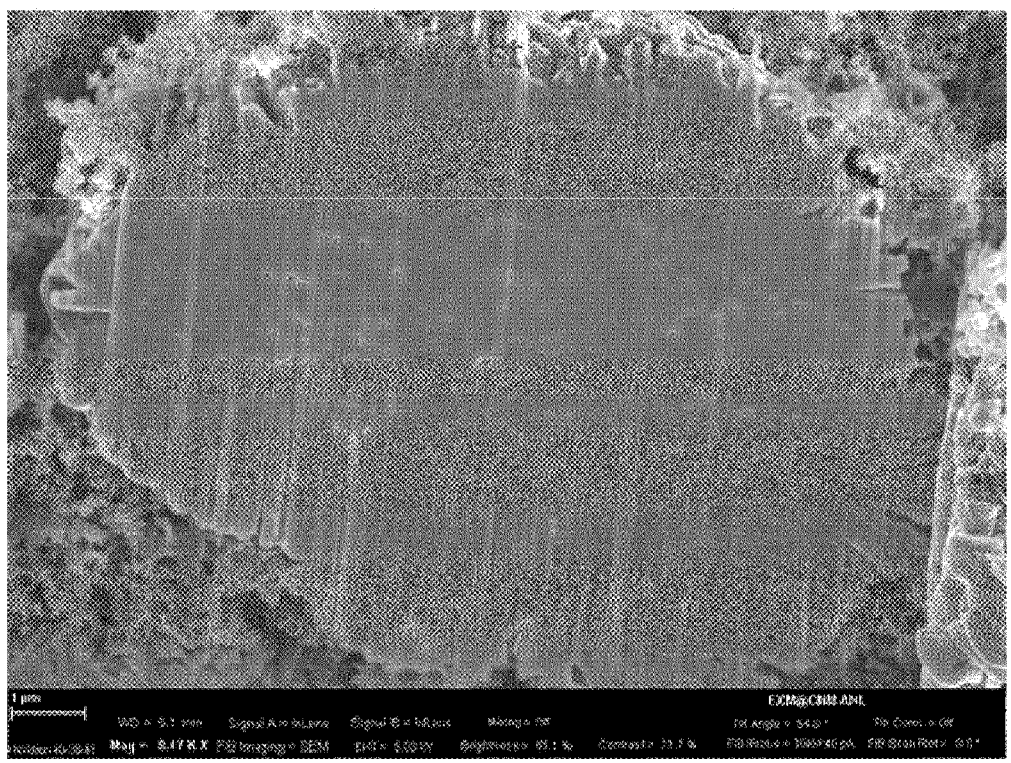
FIGS. 10, 11, and 12 depict the cross-sections of the core-gradient $LiNi_{0.8}Mn_{0.1}Co_{0.1}O_2$ particles with different cycles. It is clear that the micro-crack is absent in the interior of the particles even after 100 cycles (FIG. 12) compared to the pristine cathode (FIG. 10) and cathode cycles for 50 cycles (FIG. 11), which directly proves the excellent electrochemical cycle stability of the core-gradient $LiNi_{0.8}Mn_{0.1}Co_{0.1}O_2$ at high voltage.
Figure 11:
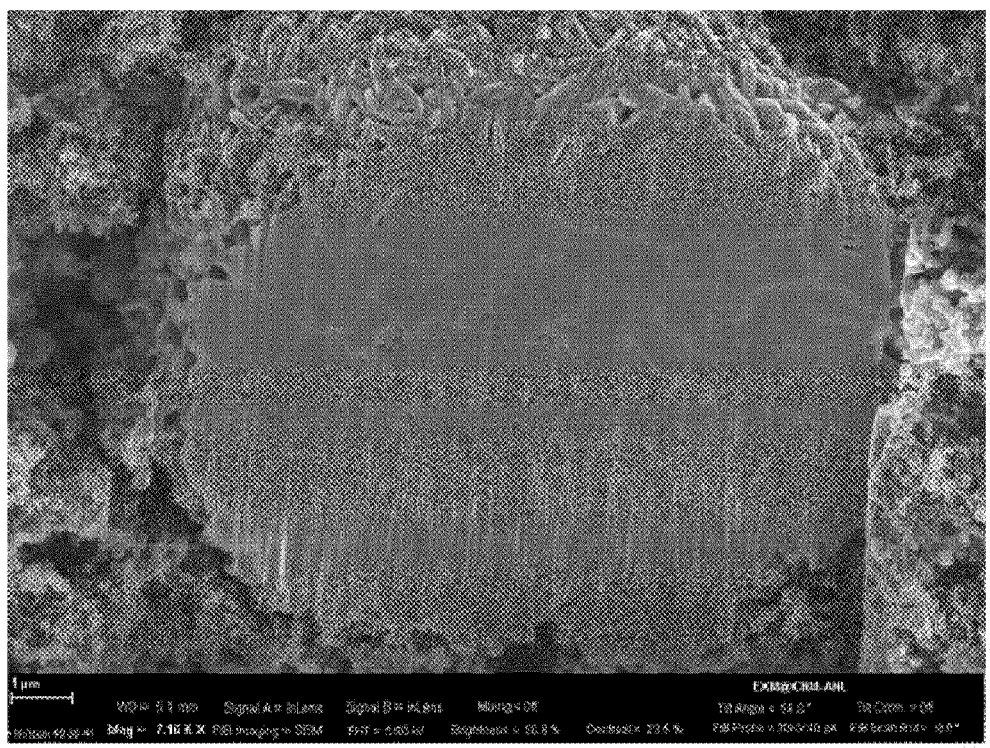
Figure 12:
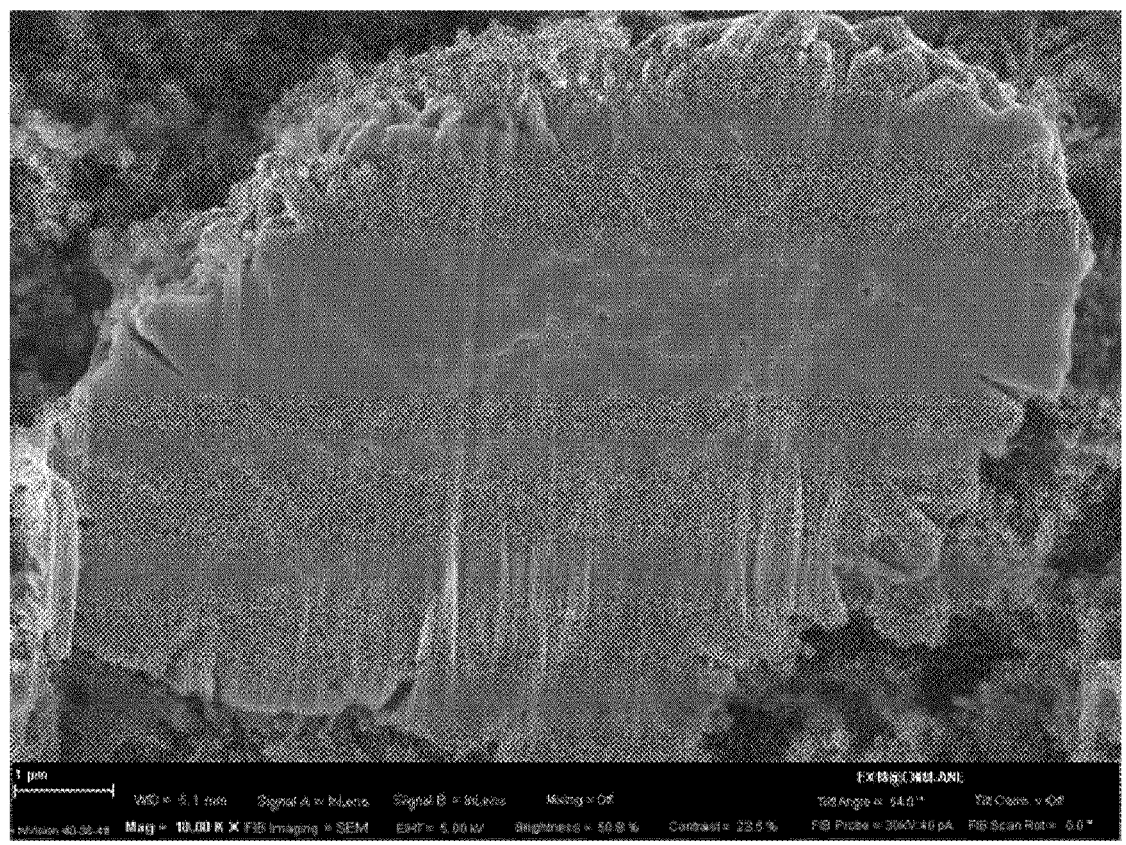

Example 10. The internal morphology characterization of the core-gradient LiNi$_{0.8}$Mn$_{0.1}$Co$_{0.1}$O$_2$ (a representative sample of Example 1) after cycling. It is well-known that the micro-crack of the secondary particles of the battery is one of the main reasons for the capacity decay of the high-nickel cathode material. During repeated cycles, the cracks between the primary particles are gradually generated due to repeated expansion and contraction of these particles during charging and discharging, which leads to the electrolyte penetrates rapidly into the bulk structure, and then raises complex interfacial reactions. The focused ion beam (FIB) and scanning transmission electron microscope (STEM) are combined to characterize the internal morphology of the particles after different cycles. FIGS. 10-12 show the cross-sections of the core-gradient LiNi$_{0.8}$Mn$_{0.1}$Co$_{0.1}$O$_2$ particles (a representative sample of Example 1) with different cycles. It is clear that the micro-crack is absent in the interior of the particles even after 100 cycles, which directly proves the excellent electrochemical cycle stability of the core-gradient LiNi$_{0.8}$Mn$_{0.1}$Co$_{0.1}$O$_2$.

Example 11. The preparation of comparative example with different composition gradient design. The comparative sample is characterized by concentration gradient design, wherein the Ni concentration is constant from the core to the surface, the Mn concentration is increased from the core to surface; and the Co concentration is decreased from the core to the surface.

Figure 13:
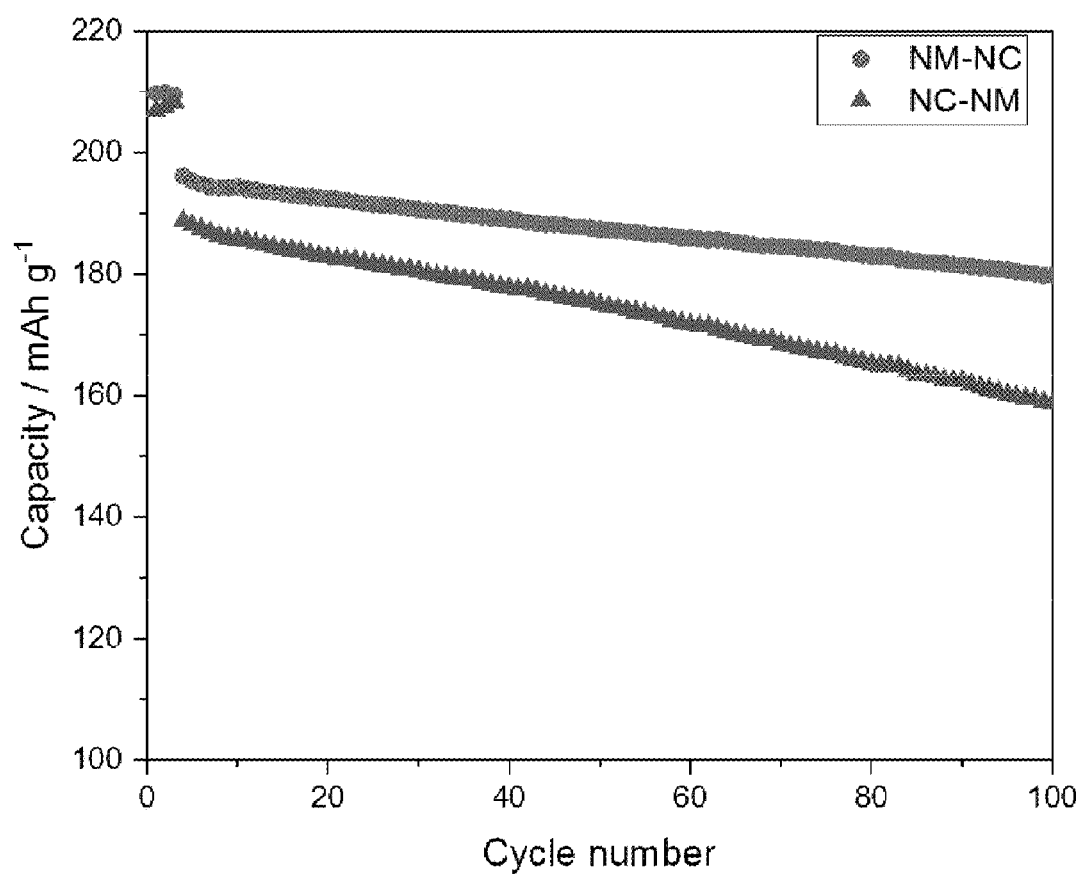
FIG. 13 is a comparison of the discharge capacities and capacity retentions of a representative composition of the present invention and the comparative sample with different composition design. The representative composition is characterized by the core-gradient concentration cathode, wherein Ni concentration is constant, Mn concentration is decreased from the core to the surface, and Co concentration is increased from the core to the surface. The comparative sample with different composition design is characterized by core-gradient composition like prior art concentration gradient cathode, wherein Ni concentration is constant, Mn concentration is increased from the core to the surface, and Co concentration is decreased from the core to the surface.

Example 12. FIG. 13 compares the discharge capacities and capacity retentions of Examples 1 and 11 using lithium metal as the anode. Example 1 is characterized by core-gradient composition wherein the Ni concentration is constant from the core to the surface, the Mn concentration is decreased and the Co concentration is increased; Example 11 (comparative sample) is characterized by core-gradient composition like the prior art of concentration gradient cathode, wherein the Ni concentration is constant from the core to the surface, the Co concentration is decreased and the Mn concentration is increased. The cells were initially activated 3 cycles at current rate of C/10, and then cycled at current rate of C/2 at the voltage range of 3.0-4.4 V. It was demonstrated that the cathode containing active cathode material of the present technology had a better electrochemical performance than comparative sample.

Figure 14:
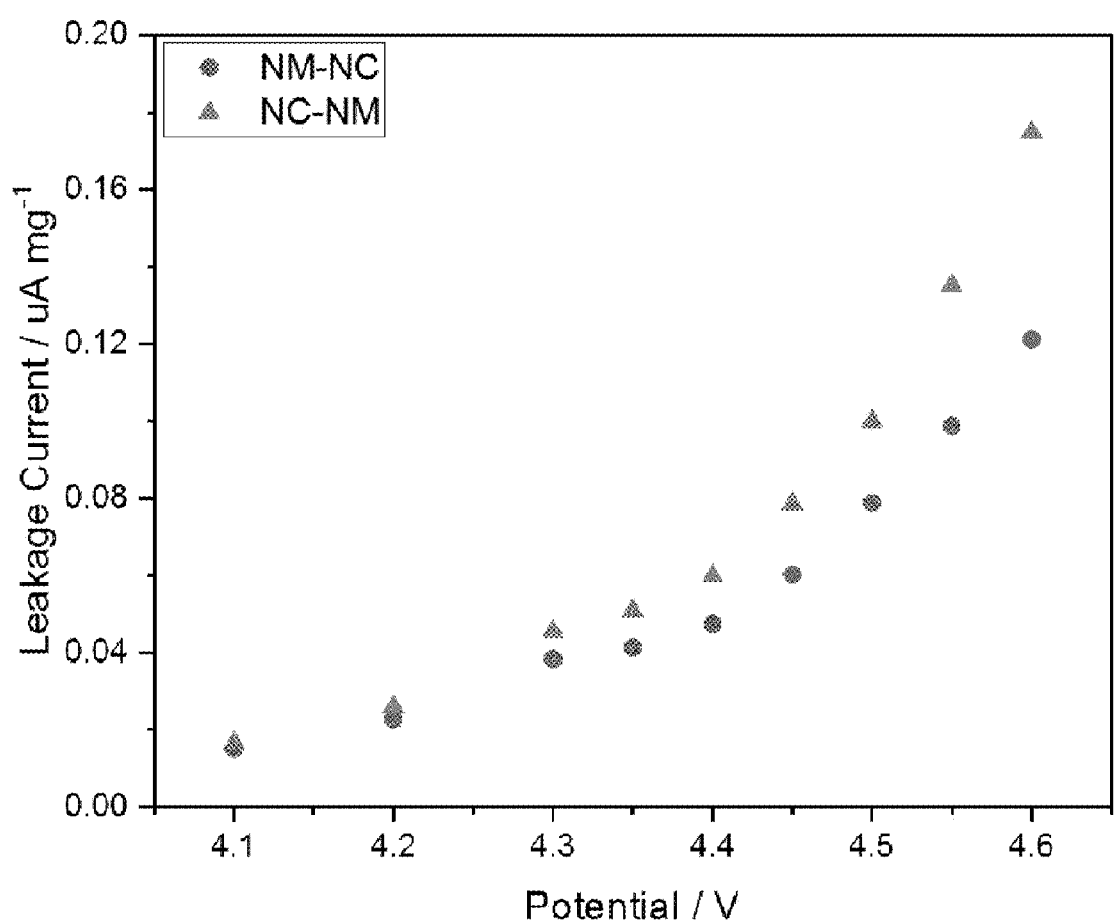
FIG. 14 compares the leakage currents of a representative composition of the present invention and the comparative sample with different composition design. The representative composition is characterized by the core-gradient concentration cathode, wherein Ni concentration is constant, Mn concentration is decreased from the core to the surface, and Co concentration is increased from the core to the surface. The comparative sample with different composition design is characterized by core-gradient composition like prior art concentration gradient cathode, wherein Ni concentration is constant, Mn concentration is increased from the core to the surface, and Co concentration is decreased from the core to the surface.

Example 13. The leakage current comparison of these cathodes. FIG. 14 compares the leakage current of Examples 1 and 11 during charge process. It was demonstrated that the cathode containing active cathode material of the present technology had a less interface side reaction than comparative sample.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A process of preparing a gradient cathode material, the process comprising:
    preparing a core composition solution (Sol1) comprising Ni, Mn, and Co ions in a first molar ratio;
    preparing a surface composition solution (Sol2) comprising Ni, Mn, and Co ions in a second molar ratio different from the first molar ratio;
    mixing in a reactor Sol1 with Sol2 in a mixing ratio (volume basis) from 100%:0% to 0%:100% with gradual change and with a chelating agent and a precipitant agent at the same time to form a precipitate having a concentration of Ni that is constant or slightly decreased along a vector radius of the particle, a concentration of Mn that is constant or partly/continuously decreased along the vector radius; and a concentration of Co that is partly/continuously increased along the vector radius;
    mixing the precipitate with a lithium or sodium salt to form a mixed precipitate and lithium or sodium salt; and
    heating-treating the mixed precipitate and lithium or sodium salt to form the gradient cathode material;
    wherein:
        the total amount of Co in the combined Sol1 and Sol2 is less than 50 mol % based on all metals;
        the vector radius is defined from a center to a surface of the particle;
        the surface of the particle is free of Mn; and
        the center of the particle is free of Co.

2. The process of claim 1, wherein: Sol1 and Sol2 are prepared by mixing the salts of Ni, Mn, and Co selected from the group consisting of hydroxides, halides, sulfates, sulfites, chlorates, nitrates, acetates, phosphates, citrates, carbonates, oxalates, and a mixture of any two or more thereof.

3. The process of claim 1, wherein the chelating agent is ammonium sulfate or ammonium nitrate and a concentration of the chelating agent is from 0.1 M to 10 M and a ratio of the chelating agent to Sol1 and Sol2 is 0.1 to 5 on a molar basis.

4. The process of claim 1, wherein the lithium or sodium salt is lithium hydroxide, lithium carbonate, lithium oxalate, lithium nitrate, or a mixture of any two or more thereof; and a ratio of the lithium to the precipitate is 1.0 to 1.1 on a weight basis.

5. The process of claim 1, wherein the lithium or sodium salt is sodium hydroxide, sodium carbonate, sodium oxalate, sodium nitrate, or a mixture of any two or more thereof; and a ratio of the sodium to the precipitate may be 0.5 to 1.1 on a weight basis.

6. The process of claim 1, wherein the gradient cathode material is a cathode active material of formula $LiNi_xMn_yCo_zO_2$ or $NaNi_xMn_yCo_zO_2$ in the form of a generally spherical particle, and having a partial or whole particle concentration gradient along a vector radius of the particle,
    wherein:
        at any given point in the vector radius of the particle, and except for the provisos below, $0.5 < x \le 1$, $0 \le y \le 0.33$, $0 \le z \le 0.33$;
        with the proviso that the surface of the particle is free of Mn;
        with the proviso that the center of the particle is free of Co; and
        with the proviso that the Co concentration increases along the vector radius of the particle.

7. The process of claim 6, wherein Sol1, Sol2, or both Sol1 and Sol2 include a dopant cation M', wherein M' is selected from the group consisting of Mg, Al, Ca, Cr, V, Fe, Cu, Zn, Zr, Nb, Mo, Ru, Ir, La, Y, Ag, Ba, Sb, and a combination of any two or more thereof.

8. The process of claim 7, wherein the gradient cathode material is of formula $LiNi_xMn_yCo_zM'_\alpha O_2$, wherein $0 < \alpha \le 0.1$ and the dopant M' is of a constant concentration across the whole particle or the dopant M' is present at the surface of the particle.

9. The process of claim 6 further comprising a coating on the surface of the particle.

10. The process of claim 9, wherein the coating comprises a metal oxide, a metal fluoride, a metal phosphate, a conductive carbon coating, or a combination of any two or more thereof.

11. The process of claim 9, wherein the coating comprises a metal oxide selected from the group consisting of MgO, $Al_2O_3$, $ZrO_2$, $MnO_2$, $CeO_2$, $TiO_2$, ZnO, $SiO_2$, $SnO_2$, and $Cr_2O_3$; a metal fluoride selected from the group consisting of $AlF_3$, $CaF_2$, $CeF_3$, ZrF, $ZrF_2$, $ZrF_3$, $ZrF_4$, $LaF_3$, and $SrF_2$; a metal phosphate selected from the group consisting of $AlPO_4$, $YPO_4$, $Li_3PO_4$, $FePO_4$, $Mg_3(PO_4)_2$, $Zn_3(PO_4)_2$, $Ca_3(PO_4)_2$, $Co_3(PO_4)_2$, and $Ni_3(PO_4)_2$; a conductive polymer selected from the group consisting of polyacetylenes, polypyrroles, polyparaphenylenes, polythiophene, polyfurans, polythianaphthenes, polyanilines, and their derivatives or copolymers; or a combination of any two or more thereof.

* * * * *